April 20, 1965 B. J. GRACE ETAL 3,179,747
COMPARISON NETWORK
Filed Jan. 7, 1964
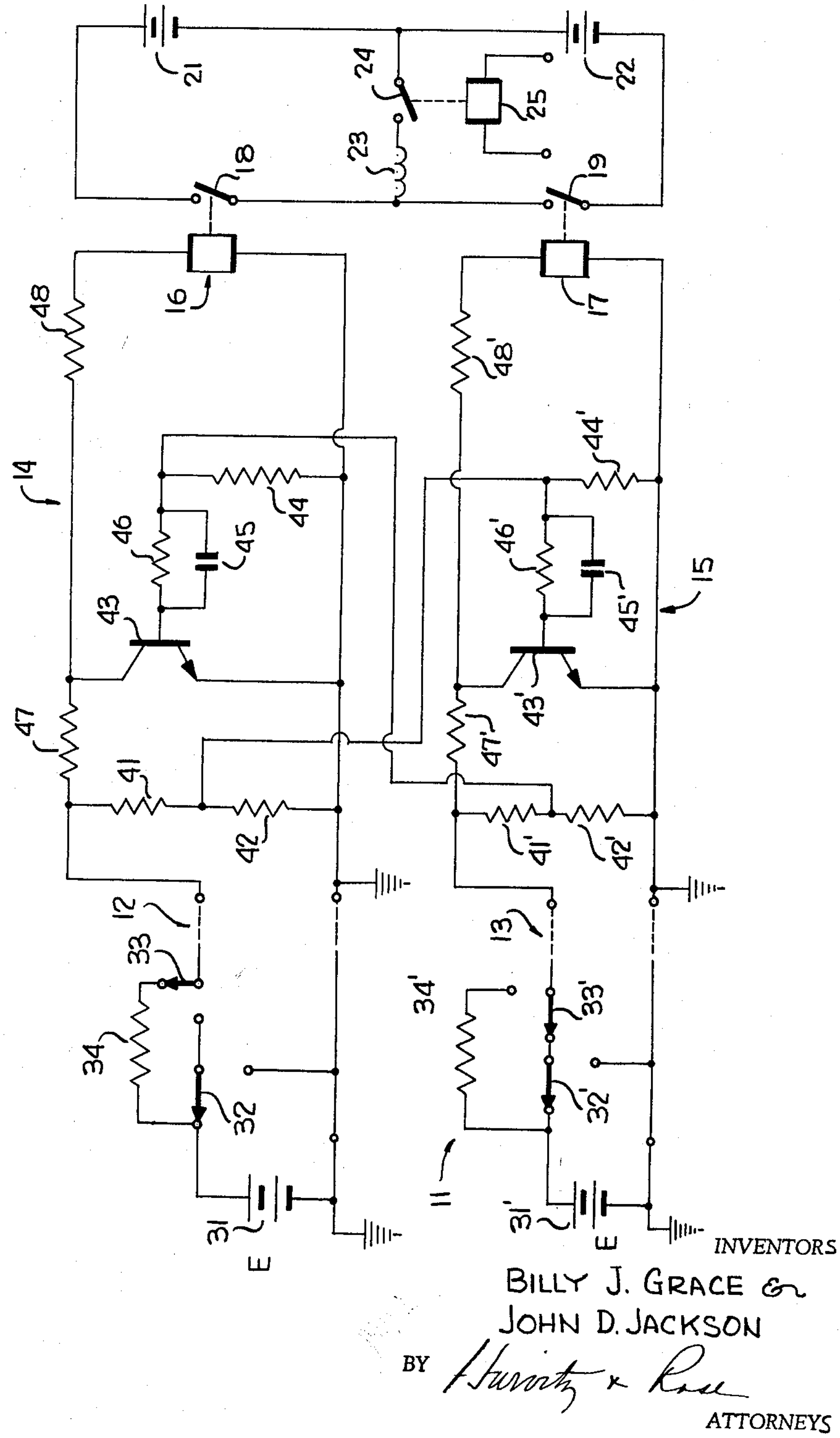
INVENTORS
BILLY J. GRACE &
JOHN D. JACKSON
BY Hurvitz & Rose
ATTORNEYS

United States Patent Office 3,179,747
Patented Apr. 20, 1965

3,179,747
COMPARISON NETWORK

Billy J. Grace and John D. Jackson, both of Brevard County, Fla., assignors to Radiation Incorporated, Melbourne, Fla., a corporation of Florida Filed Jan. 7, 1964, Ser. No. 336,249
7 Claims. (Cl. 178—70)

The present invention relates generally to amplitude comparison circuits adapted for use in converting neutral telegraphy pulses to polar telegraphy pulses. More particularly, the invention relates to a comparison network, each channel of which is responsive to a separate input level and includes a cross over network responsive to the conductive status of the other channel.

In long line, wire telegraphy systems responsive to neutral pulses, i.e. pulses that vary between zero current and currents of only one, predetermined, polarity, it is common to utilize a pair of transmission lines. To one of the lines, the transmitter applies a current of predetermined amplitude. The current supplied to the other line varies between zero and a maximum value to represent space and mark signals. The current amplitude supplied to the first line is a fixed percentage of the maximum current coupled to the second line. At the receiver, the relative current magnitudes received on the two lines are compared to provide mark and space indications. A system of this nature is considered to be very reliable because both lines generally may be assumed to provide substantially the same signal attenuation at any time so that comparisons are made with reference to the line transmission characteristics and not an arbitrary standard.

Generally in the past, long line receivers for converting neutral pulses to polar pulses have required the use of vacuum tubes or relays. To our knowledge no satisfactory solid state circuit has been developed to perform this function, although solid state relay type networks are available for coupling received polar pulses into a polar receiver. Of course, the utilization of solid state circuits in telegraphy receivers is desirable because of size, reliability and power consumption factors. In addition, it is desirable for the solid state circuit to be activated solely by the line currents and not require an external power supply.

According to the present invention, a network for converting neutral telegraphy signals, received at the end of a long line, to polar signals is attained by providing a pair of substantially identical receiver channels. Each channel includes a transistor having its emitter collector path powered only by the telegraphy signals received on the line to which it is connected. The transistor, when energized, shunts the line so that no current is supplied to the telegraphy receiver solid state relay connected to selectively activate the telegraphy receiver energizing coil.

Transistor energization is controlled by the relative amplitudes of the currents supplied to the two channels. This is accomplished by feeding a certain percentage of the current supplied to the one channel to the base emitter junction of the other channel. The transistors of both channels are regeneratively connected together so that only one is conducting at a time. The conducting transistor is in the channel having the least current amplitude supplied to it. Since the transistor of the channel having the greatest line current supplied to it is not conducting, the solid state relay load of that channel will be energized. By connecting a solid state relay across each transistor a polar telegraphy printer may be activated from a pair of opposite polarity current sources.

It is accordingly an object of the present invention to provide a new and improved amplitude comparator.

Another object of the invention is to provide a solid state network particularly adapted for converting neutral telegraphy pulses received over a long line into polar telegraphy pulses, which network does not require an external power source but is energized solely by power supplied by the two channels.

A further object of the invention is to provide a new and improved comparison circuit utilized in converting neutral telegraphy signals received over a long line into polar telegraphy signals that can be handled by existing solid state relay circuits.

Still another object of the invention is to provide a new and improved, yet inexpensive, reliable and low power consuming circuit for converting neutral telegraphy signals into polar signals.

The above and still further objects, features and advantages of the present invention will become apparent upon consideration of the following detailed description of one specific embodiment thereof, especially when taken in conjunction with the accompanying drawings, wherein the single figure is a circuit diagram of a preferred embodiment of the invention.

Reference is now made to the single figure of the drawing wherein a two channel, neutral transmitter 11 is connected to a pair of long wire transmission lines 12 and 13. At the receiver ends of lines 12 and 13, a pair of relative comparison networks 14 and 15 are provided. Networks 14 and 15 supply control voltages to solid state relays 16 and 17, respectively, the contacts 18 and 19 of which make and break circuits between positive and negative D.C. supplies 21 and 22, and a polar telegraphy receiver including load 23, which is usually a polar telegraph relay activating coil. While solid state relays 16 and 17 are shown diagrammatically as conventional relay coils and contacts, it is to be understood that these components are, in fact, any of the generally available transistor circuits or electro-mechanical relay devices.

Connected between the common terminal of supplies 21 and 22 and the terminal common to contacts 18 and 19 of solid state relays 16 and 17, are load 23, contact 24 of relay 25 and other telegraph devices and circuits generally found in telegraph terminal equipment (not shown). Relay 25 is periodically activated to open contact 24 only during the time that no transition information is present in the signal lines 12 and 13. At this time the two D.C. current levels of lines 12 and 13 are compared in receivers 14 and 15 to control activation of relays 16 and 17. Relay 25 also supplies an interrupt command to the transmitter by means of the associated telegraph terminal equipment when a telegraphy break function is effected.

Since the receiver circuitry for comparison networks 14 and 15 is identical for both channels, a description for the components associated with line 12 suffices for line 13. Reference numerals for like components are identical except for a prime notation utilized in connection with line 13.

At the transmitter, D.C. power supply 31 of predetermined current and voltage rating is selectively connected to line 12 via double pole, single throw switches 32 and 33. A contact of switch 33 is selectively connected to supply 31 via resistor 34, having a value designed to reduce by one-half the current supplied by source 31 to line 12.

With switch 33 connecting resistor 34 to line 12, activation of switch 32 has no effect on the current amplitude supplied to the line and the line can then be considered as transmitting a reference current. Thus, in the position of switch 33 illustrated, an indication is provided at the receiver that the transmitter is on the line. Under the illustrated conditions, switch 33′ is connected to switch 32′ and neutral mark and space indicating pulses are transmitted by activating the latter switch. With switch 32′ coupling supply 31′ to the line 13 a positive current having a magnitude equal to the rated value of supply 31′ is indicative of a mark. When switch 32′ decouples source 31′ from line 13, a short circuit is applied across the line to reduce the transmitted current to zero.

Of course, it is to be understood that the function of lines 12 and 13 can be reversed by connecting contacts 33 and 33′ in a manner oppositely to that illustrated. In such a case, the reference current is supplied to line 13 while mark and space bauds are fed to line 12 in response to switch 32 coupling zero current or the rated current of supply 31, respectively, to line 12.

It is noted that the positions of switch 32 are opposite to those of switch 32′ for the mark and space indications when the function of the channel is reversed. This is because the signal applied to relays 16 and 17 cause opposite polarity currents to be supplied to coil 23 from supplies 21 and 22. If no transition signals are being transmitted from transmitter 11 to the receiver, switches 33 and 33′ are connected to resistor 34 and switch 32′ which are connected to supplies 31 and 31′.

At the receiver end of line 12, a high impedance voltage divider including resistors 41 and 42 is provided. The voltage divider tap is connected to the base emitter junction of NPN transistor 43′ via a current differentiating network including shunt resistor 44′ and the parallel combination of capacitor 45′ and resistor 46′. The emitter collector path of transistor 43 is connected across the output terminals of line 12 via current limiting resistor 47 and shunts the control circuit of relay 16 by its connection through resistor 48.

In describing the operation of the present invention, it is assumed that one half the rated current of supply 31 is supplied to line 12 and that rated or zero current pulses, indicative of marks and spaces, are supplied to line 13. Contact 24 is assumed to remain closed except when transitions in the received signals occur in accordance with known telegraphy techniques.

Initially, it is assumed that no current is applied by line 13 to circuit 15. In consequence, zero and relatively large positive currents are supplied to the bases of transistors 43 and 43′. Thereby, a large impedance is provided by transistor 43 between its collector emitter path across resistors 41 and 42 and relay 16. Sufficient current is thereby applied by line 12 to relay 16 to maintain contact 18 closed so that a positive current is supplied by source 21 to coil 23.

Simultaneously, any spurious currents supplied by line 13 to network 15 do not reach relay 17 because of the low saturation impedance provided by the emitter collector path of transistor 43′ across the relay. Transistor 43′ is in a saturated condition because of the large forward bias applied to its emitter base junction by line 12 via resistors 41 and 42. Because no current is supplied to relay 17, contact 19 remains open and no negative current is supplied by source 22 to coil 23.

In response to switch 32′ being activated to couple the rated current value of supply 31′ to line 13, the leading edge of a positive current pulse is applied to network 15 across resistors 41′ and 42′. At the beginning of the current pulse, transistors 43 and 43′, as well as relays 16 and 17 remain in the same conditions indicated supra for the zero current state of line 13.

As the current amplitude of the positive going, leading edge in line 13 approaches the amplitude applied by line 12 to network 14, the base emitter junction of transistor 43 becomes appreciably forward biased. This action occurs rapidly because of the low impedance path provided by capacitor 45 to the leading pulse edge. In consequence, the emitter collector impedance of transistor 43 decreases as does the voltage across resistors 41 and 42. As the voltage across resistors 41 and 42 drops the forward bias of transistor 43′ becomes less, and more current is available to resistors 41′ and 42′ so that additional forward biasing of transistor 43 results.

The current magnitude supplied to network 15 further increases the switching action of transistors 43 and 43′ in combination with resistors 41, 42, 41′ and 42′, whereby the circuit becomes completely regenerative so that a complete reversal of the transistor states is attained within a period of not more than approximately 10 microseconds. Thus, transistor 43 is now in saturation while transistor 43′ is cut off. Thereby, relays 17 and 16 are activated and deactivated, respectively, so that a negative current is applied by supply 22 through contact 19 to coil 23.

When switch 32′ is activated so that a short circuit is again placed across the input of line 13, a negative going current pulse is applied to network 15 across resistors 41′ and 42′. This pulse regeneratively returns transistors 43 and 43′ to the non-conduction and conducting states, respectively, in exactly the opposite manner indicated supra for the positive going situation.

The relative current amplitudes applied by lines 12 and 13 to networks 14 and 15 determine the current magnitudes at which the regenerative switching action occur. If lines 12 and 13 have different attenuation factors, it may be desirable to vary the relative values of these switching currents. This may be accomplished by substituting potentiometers for resistors 41, 42, 41′ and 42′ and adjusting the potentiometer sliders as necessary.

While the present invention has been illustrated specifically in connection with a neutral transmitter and a polar receiver, it is also applicable for utilization with the neutral-neutral transmission mode. In this mode, circuitry involved is identical to that illustrated except that relay 16, contact 18, supply 21 and resistor 48 are omitted. Thereby, a mark indication results in negative current being supplied by source 22 through contact 19 to load 23. A received space causes no current to flow through load 23 since no supply is then connected to it.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. In a telegraphy typewriter receiver having two separate sets of terminals responsive to receive current levels indicative of telegraphy signals, one or both of said levels being variable, said receiver having a current responsive coil selectively connected by a current responsive, normally open switch with a power supply, said switch being closed in response to the application of current to its input terminals, a solid state comparison circuit responsive to said current levels and deriving power only from said current levels, said solid state comparison circuit comprising first and second transistors having normally unbiased emitter base junctions so that their emitter collector impedance is normally relatively large, means for energizing the emitter collector path of said first transistor only in response to power supplied to the first set of terminals by one of said current levels, means for energizing the emitter collector path of said second transistor only in response to power supplied to the second set of terminals by the other of said current levels, means for supplying a portion of the power supplied by said other current level to said second set of terminals as a gating signal to the emitter base junction of said first transistor, means for supplying a portion of the power supplied by said one current level to said first set of terminals as a gating signal to the emitter base junction of said second transistor, said gating signals when applied to said junctions substantially reducing the emitter collector impedance of the respective transistor, said means for supplying connecting said transistors in a circuit so that at any time only one of said transistors can conduct and have a relatively low collector emitter impedance, which of said transistors has a low collector emitter impedance being dependent upon a predetermined ratio of the relative current levels supplied to said sets of terminals, and means for coupling the input terminals of said switch with the emitter collector path of said one transistor so that substantially no current is supplied to the switch when said one transistor is conducting.

2. In a telegraphy typewriter receiver having two separate sets of terminals responsive to received current levels indicative of telegraphy signals, one or both of said levels being variable, said receiver having a current responsive coil selectively connected by a first current responsive normally open switch with a power supply of a first polarity or a second current responsive normally open switch with a power supply of a second polarity, said switches being closed in response to the application of current to their input terminals, a solid state comparison circuit responsive to said current levels and deriving power only from said current levels, said comparison circuit comprising first and second transistors having normally unbiased emitter base junctions so that their emitter collector impedance is normally relatively large, means for energizing the emitter collector path of said first transistor only in response to power supplied to the first set of terminals by one of said current levels, means for energizing the emitter collector path of said second transistor only in response to power supplied to the second set of terminals by the other of said current levels, means for supplying a portion of the power supplied by said other current level to said second set of terminals as a gating signal to the emitter base junction of said first transistor, means for supplying a portion of the power supplied by said one current level to said first set of terminals as a gating signal to the emitter base junction of said second transistor, said gating signals when applied to said junctions substantially reducing the emitter collector impedance of the respective transistor, said means for supplying connecting said transistors in a circuit so that at any time only one of said transistors can conduct and have a relatively low collector emitter impedance, which of said transistors has a relatively low collector emitter impedance being dependent upon a predetermined ratio of the relative current levels supplied to said sets of terminals, means for coupling the input terminals of said first switch across the emitter collector path of said one transistor so that substantially no current is supplied to the input terminals of said first switch when said first transistor is conducting, and means for coupling the input terminals of said second switch with the emitter collector path of said second transistor so that substantially no current is supplied to the input terminals of said second switch when said second transistor is conducting.

3. In a telegraphy typewriter receiver having two separate sets of terminals responsive to received current levels indicative of telegraphy signals, one or both of said levels being variable, said receiver having a current responsive coil selectively connected by a current responsive normally open switch with a power supply, said switch being closed in response to the application of current to its input terminals, a solid state comparison circuit responsive to said current level and deriving power only from said current levels, said comparison circuit comprising first and second semi-conductor elements, each of said semi-conductor elements including a first electrode for emitting charged carriers, a second electrode for receiving said charged carriers and a third electrode disposed between said first and second electrodes for controlling the flow of said charged carriers between said first and second electrodes, the impedance of said elements between said first and second electrodes being relatively large when no charged carriers are supplied by said first electrode to said second electrode and being relatively small when charged carriers are supplied by said first electrode to said second electrode, said first and second semi-conductor elements having normally unbiased junctions between said first and third electrodes so that the impedance between said first and second electrodes is normally relatively large, means for energizing the path between the first and second electrodes of said first semi-conductor element only in response to power supplied to the first set of terminals by one of said current levels, means for energizing the path between said first and second electrodes of said second semi-conductor element only in response to power supplied to the second set of terminals by the other of said current levels, means for supplying a portion of the power supplied by said other current level to said second set of terminals as a gating signal to the junction between the first and third electrodes of said first semi-conductor element, means for supplying a portion of the power supplied by said one current level to said first set of terminals as a gating signal to the junction between the first and third electrodes of said second semi-conductor elements, said gating signals when applied to said junction of each element substantially reducing the impedance of the respective semi-conductor element between said first and second electrodes, said means for supplying connecting said semi-conductor elements in a circuit so that at any time only one of said semi-conductor elements conducts between its first and second electrodes and has a relatively low impedance between said first and second electrodes, which of said semi-conductor elements has a low impedance between its first and second electrodes being dependent upon a predetermined ratio of the relative current levels supplied to said sets of terminals, and means for coupling the input terminals of said switch with the emitter collector path of said one semi-conductor element so that substantially no current is supplied to the switch when said one semi-conductor element is conducting between its first and second electrodes.

4. In a telegraphy teletypewriter receiver having two separate sets of terminals responsive to received current levels indicative of telegraphy signals, one or both of said levels being variable, said receiver having a current responsive coil selectively connected via a current responsive, normally open switch with a power supply, said switch being closed in response to the application of current to its input terminals, a solid state comparison circuit responsive to said current levels and deriving power only from said current levels, said comparison circuit comprising first and second transistors, means for energizing the emitter collector path of said first transistor only in response to power supplied to the first set of terminals by one of said current levels, means for energizing the emitter collector path of said second transistor only in response to power supplied to the second set of terminals by the other of said current levels, means for biasing the emitter base junction of said second transistor only in response to the power supplied to said first set of terminals, means for biasing the emitter base junction of said first transistor only in response to the power suppplied to said second set of terminals, the emitter collector impedances of said first and second transistors being relatively large when the junctions of said first and second transistors are respectively unbiased, said means for biasing connecting said transistors in a circuit so that at any time only one of said transistors can conduct substantially and have a relatively low collector emitter impedance, which of said transistors has a low collector impedance being dependent upon a predetermined ratio of the relative current levels supplied to said sets of terminals, and means for coupling the input terminals of said switch with the emitter collector path of said one transistor so that substantially no current is applied to the switch when said one transistor is conducting.

5. In a telegraphy teletypewriter receiver having two separate sets of terminals responsive to received current levels indicative of telegraphy signals, one or both of said levels being variable, said receiver having a current responsive coil selectively connected via a first current responsive normally open switch with a power supply of a first polarity and a second current responsive normally open switch with a power supply of a second polarity, a solid state comparison circuit responsive to said current levels and deriving power only from said current levels, said comparison circuit comprising first and second transistors having their base emitter junctions respectively connected to said second and first terminals to be biased only by the power supplied to said terminals by said signals, the base emitter junctions of said transistors being connected with said terminals so that the emitter collector paths of both of said transistors are of relatively high impedance except when the current levels applied to said terminals exceeds a predetermined relative amount, means for energizing the emitter collector path of said first transistor only in response to power supplied to the first set of terminals by one of said current levels, means for energizing the emitter collector path of said second transistor only in response to power supplied to the second set of terminals by the other of said current levels, said means for supplying and said connections between said terminals and said base emitter junctions connecting said transistors in a circuit so that at any time only one of said transistors can conduct substantially and have a relatively low collector emitter impedance, which of said transistors has a low collector emitter impedance being dependent upon a predetermined ratio of the relative current levels supplied to said sets of terminals, means for coupling the input terminals of one of said switches with the emitter collector path of said one transistor so that substantially no current is applied to the switch when said one transistor is conducting and said switch remains deactivated, and means for coupling the input terminals of said other switch with the emitter collector path of the other transistor so that substantially no current is applied to the other switch when said second transistor is conducting and said second switch remains deactivated.

6. In a telegraphy teletypewriter receiver having two separate sets of terminals responsive to received current levels indicative of received telegraphy signals, one or both of said levels being variable, said receiver having a current responsive coil connected via a current responsive normally open switch with a power supply, said switch being closed in response to the application of current to its input terminals, a solid state comparison circuit responsive to said current levels and deriving power only from said current levels, said comparison circuit comprising first and second transistors, a D.C. path connecting said first set of terminals with the emitter collector path of said first transistor so that the emitter collector path of said first transistor is activated only in response to power supplied to said first set of terminals, a D.C. path connecting said second set of terminals with the emitter collector path of said second transistor so that the emitter collector path of said second transistor is supplied with power only in response to power supplied to the second set of terminals, a first D.C. voltage divider shunting said first set of terminals, a second D.C. voltage divider shunting said second set of terminals, a first D.C. path connected between a tap on said first voltage divider and the emitter base junction of said second transistor for supplying the only biasing potential to the emitter base junction of said second transistor, a second D.C. path connecting the tap of said second voltage divider for supplying the only biasing potential to the emitter base junction of said first transistor, said D.C. paths connecting said transistors in a regenerative circuit so that at any time only one of said transistors can conduct substantially and have a relatively low collector emitter impedance, and means for coupling the input terminals of said switch with the emitter collector path of said one transistor so that substantially no current is applied to the switch when said one transistor is conducting.

7. In a telegraphy teletypewriter receiver having two separate sets of terminals responsive to received current levels indicative of telegraphy signals received from a telegraphy line, one or both of said levels being variable, said receiver having a current responsive coil selectively connected via current responsive normally open switch with a power supply, said switch being closed in response to the application of current to its input terminals, a solid state comparison circuit responsive to said current levels and deriving power only from said current levels, said solid state comparison circuit comprising first and second transistors, means for energizing the emitter collector path of said first transistor only in response to power supplied to the first set of transistors by one of said current levels, means for energizing the emitter collector path of said second transistor only in response to power supplied to the second set of terminals by the other of said current levels, means for supplying a portion of the power supplied by said other current level to said second set of terminals as the only biasing power to the emitter base junction of said first transistor, means for supplying a portion of the power supplied by said one current level to said first set of terminals as the only biasing power to the emitter base junction of said second transistor, means for connecting said transistors so that at any time only one of said transistors can conduct substantially and have a relatively low collector emitter impedance, the emitter collector paths of said transistors being connected with said sets of terminals so that the impedance across said first set of terminals is substantially reduced when said first transistor is substantially conducting and the impedance between said second set of terminals is substantially reduced when said second transistor is conducting substantially between its emitter and collector electrodes, which of said transistors has a low collector emitter impedance being dependent upon a predetermined ratio of the relative current level supplied to said sets of terminals, and means for coupling the input terminals of said switch with the emitter collector path of said one transistor so that substantially no current is applied to the switch when said one transistor is conducting.

References Cited by the Examiner

UNITED STATES PATENTS

| | | | |
|---|---|---|---|
| 2,478,409 | 8/49 | Loughlin | 340—346 |
| 2,778,978 | 1/57 | Drew | 317—137 |
| 2,999,170 | 9/61 | Tyler | 331—49 |

NEIL C. READ, *Primary Examiner.*

ROBERT H. ROSE, *Examiner.*